(12) United States Patent
Muraki

(10) Patent No.: US 8,671,125 B2
(45) Date of Patent: Mar. 11, 2014

(54) ELECTRONIC CALCULATOR AND COMPUTER-READABLE MEDIUM

(75) Inventor: Akiko Muraki, Hamura (JP)

(73) Assignee: Casio Computer Co., Ltd, Tokyo (JP)

( * ) Notice: Subject to any disclaimer, the term of this patent is extended or adjusted under 35 U.S.C. 154(b) by 610 days.

(21) Appl. No.: 12/912,869

(22) Filed: Oct. 27, 2010

(65) Prior Publication Data

US 2011/0113080 A1    May 12, 2011

(30) Foreign Application Priority Data

Nov. 12, 2009   (JP) ................ 2009-259148

(51) Int. Cl.
*G06F 15/04*   (2006.01)
*G06F 3/00*   (2006.01)

(52) U.S. Cl.
USPC .......................................... 708/130; 708/160

(58) Field of Classification Search
USPC ............... 708/130, 162, 164, 168, 169, 160
See application file for complete search history.

(56) References Cited

U.S. PATENT DOCUMENTS

| | | | | |
|---|---|---|---|---|
| 5,519,646 A | * | 5/1996 | Uemura et al. | 708/142 |
| 5,732,001 A | * | 3/1998 | Nakayama et al. | 708/162 |
| 6,795,838 B1 | * | 9/2004 | Kataoka | 708/160 |
| 2003/0041078 A1 | * | 2/2003 | Child et al. | 708/162 |

FOREIGN PATENT DOCUMENTS

| | | |
|---|---|---|
| JP | 62-102351 | 5/1987 |
| JP | 07-200483 | 8/1995 |
| JP | 08-083246 | 3/1996 |
| JP | 2003-150565 | 5/2003 |
| JP | 2011-043917 | 3/2011 |

OTHER PUBLICATIONS

Japanese Office Action for Japanese Application No. 2009-259148 mailed on Nov. 8, 2011.

* cited by examiner

*Primary Examiner* — Chuong D Ngo
(74) *Attorney, Agent, or Firm* — Turocy & Watson, LLP

(57) ABSTRACT

According to one embodiment, there is provided an electronic calculator, including a display device, a storage having an operator priority table in which an operator operation priority is stored, and a processor that performs causing the display device to display a formula, performing sequentially an operation of each formula element constituting the formula displayed on the display device according to the operator priority table, displaying distinctly the formula element, to which the operation is performed in the formula displayed on the display device, on the display device each time each formula element operation is sequentially performed, and displaying a solution corresponding to the formula element to which the operation is performed on the display device each time each formula element operation is sequentially performed.

9 Claims, 8 Drawing Sheets

ELECTRONIC CALCULATOR AND COMPUTER-READABLE MEDIUM

CROSS-REFERENCE TO RELATED APPLICATIONS

This application is based upon and claims the benefit of priority from Japanese Patent Application No. 2009-259148, filed Nov. 12, 2009, the entire contents of which are incorporated herein by reference.

BACKGROUND

1. Field

The present invention relates to an electronic calculator suitable to learn a formula operation process and a computer-readable medium storing a control program thereof.

2. Description of the Related Art

Conventionally, there has been devised an electronic desk calculator suitable to learn the formula operation process.

In the electronic desk calculator, when an ENTER key is pressed while a formula as an operation object is displayed, operation processing is sequentially performed to only an operator that is selected from operators in the formula according to an operation priority each time the ENTER key is pressed. Each time the operation processing of the formula is performed according to the operation priority of the operator, a formula element to which the operation processing is performed is displayed while replaced with a solution of the formula element. Therefore, an operation progress situation can be confirmed on a step-by-step basis until operation result of the formula is derived.

In the conventional electronic desk calculator, each formula element to which the operation processing is performed according to the operation priority of each operator included in the formula is formula-displayed while replaced with a solution of the operation processing each time of the operation processing. Therefore, unfortunately it cannot be understood that the operation processing is performed to the provided formulas in what order, or not only contents of the original formula element replaced with the solution but also the original formula cannot be understood with the progress of operation processing although the solution can currently be confirmed.

SUMMARY

It is an object of the invention to provide an electronic calculator wherein the order in which the operation processing is performed to the formula and the operation result of each order can easily be confirmed while the original formula is displayed, and a computer-readable medium storing a control program of the electronic calculator.

According to a first aspect of the present invention, there is provided an electronic calculator, comprising: a display device; a storage having an operator priority table in which an operator operation priority is stored; and a processor that performs: causing the display device to display a formula; performing sequentially an operation of each formula element constituting the formula displayed on the display device according to the operator priority table; displaying distinctly the formula element, to which the operation is performed in the formula displayed on the display device, on the display device each time each formula element operation is sequentially performed; and displaying a solution corresponding to the formula element to which the operation is performed on the display device each time each formula element operation is sequentially performed.

According to a second aspect of the present invention, there is provided a computer-readable medium in which a software program is stored, the software program being executed by a computer system including a display device and a storage having an operator priority table in which an operation priority of an operator is stored, the software program comprising a sequence of commands for causing the computer system to perform: displaying a formula on the display device; performing sequentially an operation of each formula element constituting the formula displayed on the display device according to the operator priority table; displaying distinctly the formula element, to which the operation is performed in the formula displayed on the display device, on the display device each time each formula element operation is sequentially performed; and displaying a solution corresponding to the formula element to which the operation is performed on the display device each time each formula element operation is sequentially performed.

According to a third aspect of the present invention, there is provided an electronic calculator, comprising: a formula display section that displays a formula; an operation performing section that performs sequentially each formula element operation according to an operation priority of each formula element constituting the formula displayed by the formula display section; a distinction display section that displays distinctly the formula element, to which the operation is performed in the formula displayed by the formula display section, each time the operation performing section sequentially performs each formula element operation; and a work-in-progress solution display section that displays a solution corresponding to the formula element to which the operation is performed each time the operation performing section sequentially performs each formula element operation.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIGS. 7A, 7B, 7C, 7D, 7E, and 7F illustrate specific example (part 4) of a display operation according to the formula operation processing associated with the performance of the operation process slideshow mode of the electronic calculator 10.

DETAILED DESCRIPTION

Embodiments of the present invention will be described below with reference to the drawings.

Figure 1:
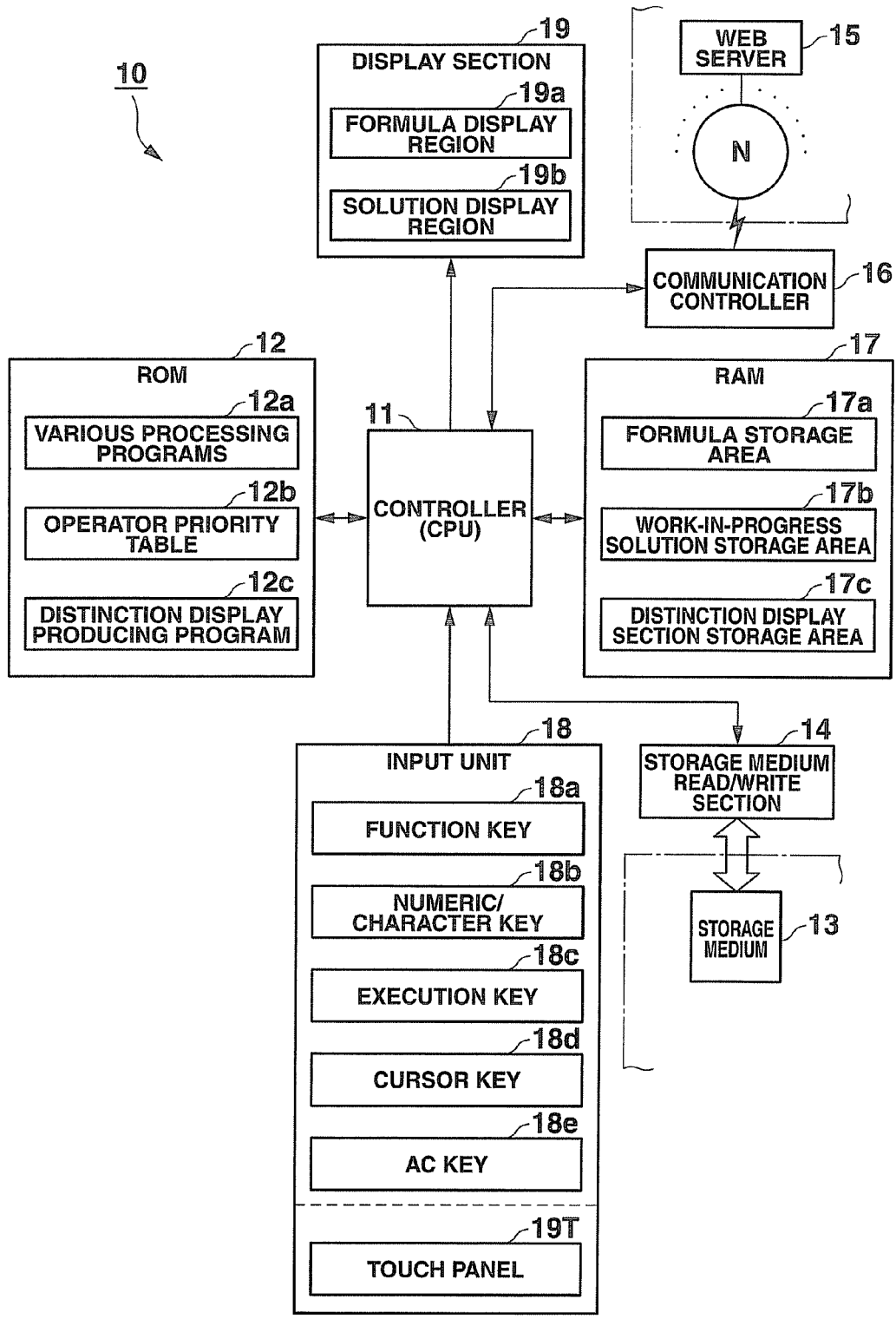
FIG. 1 is a block diagram illustrating a configuration of an electronic circuit of a compact electronic calculator 10 according to an embodiment of the invention.

FIG. 1 is a block diagram illustrating a configuration of an electronic circuit of a compact electronic calculator according to an embodiment of the invention.

The compact electronic calculator 10 includes a controller (CPU) 11.

The controller (CPU) 11 controls an operation of each circuit section while a RAM 17 is used as a working memory according to a system program or a calculator control program. The system program is previously stored in a ROM (flash ROM) 12. The calculator control program is read into the ROM 12 through a storage medium read/write section 14 from an external storage medium 13 such as a memory card, or the calculator control program is downloaded through a communication controller 16 from a Web server (program server) 15 on a communication network N and read into the ROM 12.

The system program and calculator control program, stored in the ROM 12, are activated in response to a key input signal from a key input section 18. The ROM 12, the storage medium read/write section 14, the communication controller 16, the RAM 17, the key input section 18, and a liquid crystal display section (LCD) 19 are connected to the controller (CPU) 11.

The calculator control program and various processing programs 12a are stored in the ROM 12. The calculator control program controls the operation of the whole of the electronic calculator 10. The various processing programs 12a include a formula operation program that executes operation processing according to various formulas arbitrarily input by a user.

An operator priority table 12b is stored in the ROM 12. In the operator priority table 12b, all types of operators constituting any formula are described while correlated with an operation priority of the operator. Meanwhile each operator described in the operator priority table 12b is correlated with the priority in which all rules of the formula operation, such as whether the operator exists in parentheses in the formula, which are obviously considered.

Specifically, for example, for operators "+", "−", "×", and "÷" of four arithmetic operations, "×" and "÷" have the same priority, "+" and "−" have the same priority, and "×" and "÷" have a higher priority than "+" and "−". Each operator that exists in parentheses has a higher priority than any other operator that exists outside parentheses.

An operation process distinction display producing program 12c is stored in the ROM 12. The operation process distinction display producing program 12c executes the formula operation processing in the order of the operation priority of each operator included in the formula according to the formula operation program at constant time intervals or in response to an instruction from the user. Each time of the operation processing of each operator, the operation process distinction display producing program 12c sequentially and distinctly displays the formula element to which the operation processing is performed, and individually displays the solution of the formula element. The operation process distinction display producing program 12c is activated, when an instruction to perform an operation process slideshow mode is provided in response to the user manipulation while the formula that becomes the operation object is displayed on the display section 19.

A formula storage area 17a, a work-in-progress solution storage area 17b, and a distinction display section storage area 17c are secured in the RAM 17.

Formula data that is key-input in response to the user manipulation, formula data that is read from the external storage medium 13, or formula data that is read from the Web server 15 on the external network N are stored in the formula storage area 17a.

A work-in-progress solution is stored in the work-in-progress solution storage area 17b. The work-in-progress solution is obtained, when the operation processing is performed to each formula element in the order of the operation priority of each operator included in the operation object formula in association with the formula operation processing that is performed using the formula operation program following the operation process slideshow mode and the operation process distinction display producing program 12c.

Each formula element is stored as a portion that should distinctly be displayed in the distinction display section storage area 17c. Each formula element is sequentially operated in the order of the operation priority of each operator included in the operation object formula in association with the formula operation processing that is performed using the formula operation program following the operation process slideshow mode and the operation process distinction display producing program 12c.

A "function key" 18a, a "numeric/character key" 18b, an "execution key" 18c, "↑", "↓", "←", and "→" cursor keys 18d, and an "AC key" 18e are provided in the input section 18. The "function key" 18a is manipulated when various operation modes installed in the electronic calculator 10 are specified. The "numeric/character key" 18b is manipulated when various numerical values/characters/items of symbolic data are input. The "execution key" 18c is manipulated when various items of selected or input data are fixed or when an instruction to perform the operation is provided. The cursor keys 18d are manipulated when an input position expressed by a cursor or a selection item on the display screen is moved and displayed. The "AC key" 18e is manipulated when the display data is deleted after the currently-performed function is ended.

The input section 18 also includes a transparent touch panel 19T provided on the display screen of the display section 19.

A work area where various items of data input and output from and to the controller 11 in association with the various items of operation processing is secured in the RAM 17 in addition to the formula storage area 17a, the work-in-progress solution storage area 17b, and the distinction display section storage area 17c.

For example, the display section 19 includes a dot-matrix liquid crystal display section having a display screen of 18 digits by 4 lines. When the operation object formula falls within an 18-digit element including the numeric characters/symbols/operators, a first-line region of the display screen is set to a formula display region 19a, and second-line to fourth-line regions are set to a solution display region 19b (see FIGS. 5A, 5B, 5C, 5D, 5E, and 5F).

An operation process slideshow function of the electronic calculator 10 having the above-described configuration will be described below.

Figure 2A:
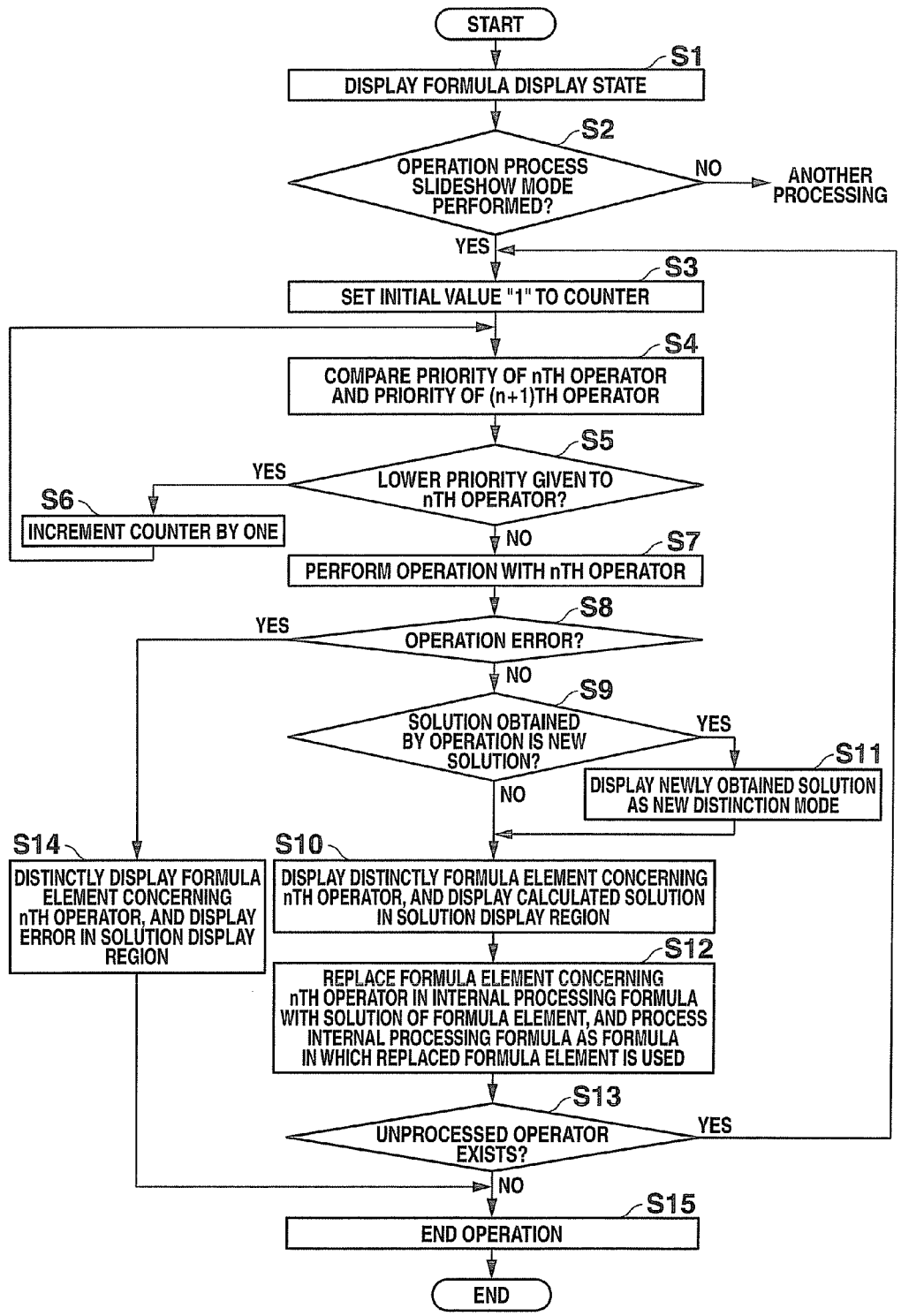
FIG. 2A is a flowchart illustrating formula operation processing associated with performance of an operation process slideshow mode of the electronic calculator 10.

FIG. 2A is a flowchart illustrating the formula operation processing associated with the operation process slideshow mode performed by the electronic calculator 10.

Figure 2B:
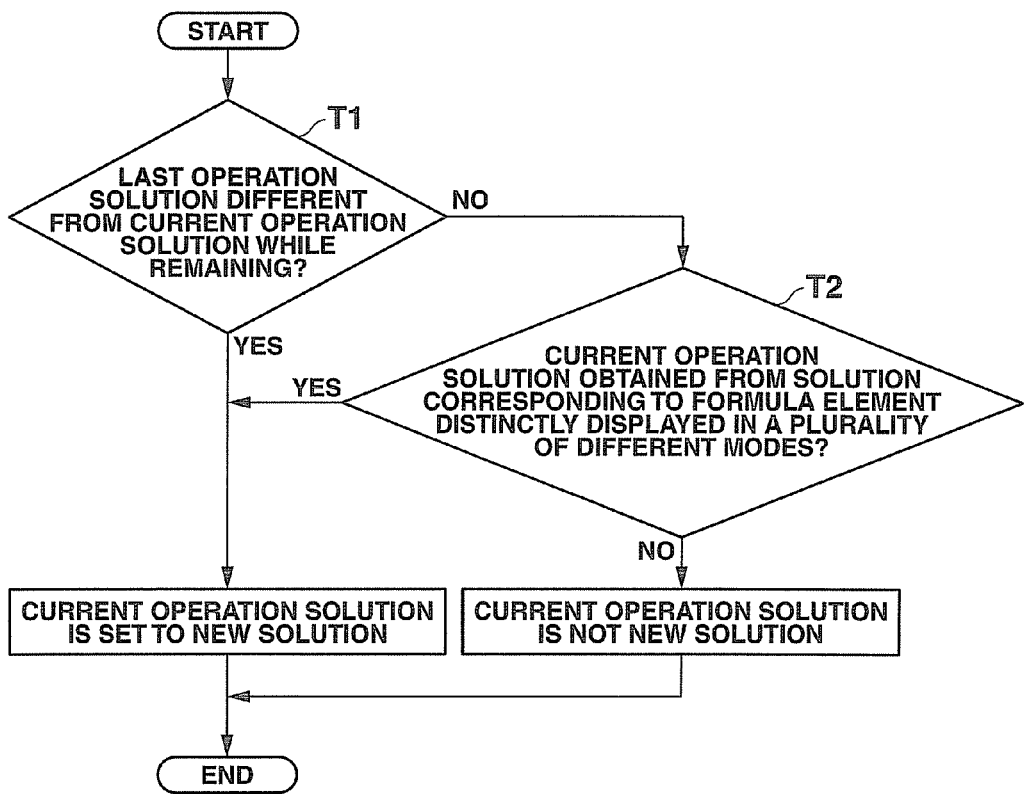
FIG. 2B is a flowchart illustrating detailed determination processing in Step S9 of FIG. 2A.

FIG. 2B is a flowchart illustrating detailed determination processing in Step S9 of FIG. 2A.

First Embodiment

FIGS. 3A, 3B, 3C, 3D, and 3E illustrate a specific example (part 1) of a display operation according to the formula operation processing associated with the operation process slideshow mode performed by the electronic calculator 10.

Figure 3A:
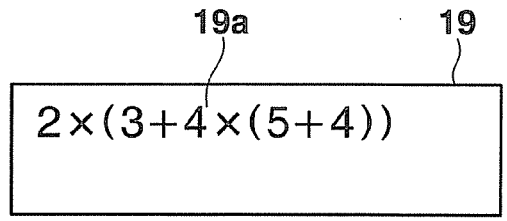
FIGS. 3A, 3B, 3C, 3D, and 3E illustrate a specific example (part 1) of a display operation according to the formula operation processing associated with the operation process slideshow mode performed by the electronic calculator 10.

As illustrated in FIG. 3A, an operation object formula "2×(3+4×(5+4))" that is read from the formula storage area 17a in response to the user manipulation is displayed in the formula display region 19a of the display section 19 (Step S1). When the instruction to perform the operation process slideshow mode is provided in response to the manipulations of the "function key" 18a and "execution key" 18c (YES in Step S2), items of formula operation processing (Step S3 to S15) following the operation process distinction display producing program 12c are started.

A counter n that specifies each operator included in the displayed formula is set to an initial value "1" (Step S3).

The operation priority of an nth (=1) operator "×" in the formula "2×(3+4×(5+4))" and the operation priority of an (n+1)th (=2) operator "+" (in parentheses) are compared to each other based on the operator priority table 12b (Step S4), and a determination whether the nth (=1) operator "×" has lower priority than the (n+1)th (=2) operator "+" (in parentheses) is made (Step S5).

At this point, because the operator "+" (in parentheses) has higher priority than the operator "×", the determination that the nth (=1) operator "×" has lower priority is made (YES in Step S5), and the counter n is incremented by "1" and set to "2" (Step S6).

Then the operation priority of the nth (=2) operator "+" (in parentheses) in the formula "2×(3+4×(5+4))" and the operation priority of the (n+1)th (=3) operator "×" (in parentheses) are compared to each other (Step S4). At this point, because the operator "×" (in parentheses) has higher priority than the operator "+" (in parentheses), the determination that the nth (=2) operator "+" (in parentheses) has lower priority is made (YES in Step S5).

Therefore, the counter n is incremented by "1" and set to "3" (Step S6), and the operation priority of the nth (=3) operator "×" (in parentheses) in the formula "2×(3+4×(5+4))" and the operation priority of the (n+1)th (=4) operator "+" (in double parentheses) are compared to each other (Step S4). At this point, because the operator "+" (in double parentheses) has higher priority than the operator "×" (in parentheses), the determination that the nth (=3) operator "×" (in parentheses) has lower priority is made (YES in Step S5).

Therefore, the counter n is incremented by "1" and set to "4" (Step S6), and the operation priority of the nth (=4) operator "+" (in double parentheses) in the formula "2×(3+4×(5+4))" and the operation priority of the (n+1)th (=5) operator are compared to each other (Step S4). However, the operator from the fifth does not exist in the formula, the determination that the nth (=4) operator "+" (in double parentheses) does not have lower priority is made (NO in Step S5).

Therefore, the operation processing is performed to the formula element "(5+4)" concerning the nth (=4) operator "+" (in double parentheses) (Step S7) to determine whether an operation error in which the solution is not obtained is produced (Step S8).

The determination that the operation error is not produced is made (NO in Step S8) because the solution "9" of the formula element "(5+4)" is obtained.

Then a determination whether the solution "9" of the formula element "(5+4)" to which the current operation processing is performed is a new solution is made (Step S9).

Specifically, a determination whether the solution obtained by the last formula element operation is different from the solution obtained by the current formula element operation while remaining without disappearing through the current operation processing is made (Step T1). When the affirmative determination (YES) is made in Step T1, the determination that the solution obtained in the current formula element operation is a new solution is obtained (YES in Step S9). On the other hand, when the negative determination (NO) is made in Step T1, a determination whether the solution obtained in the current formula element operation is obtained from a solution corresponding to the formula element that is distinctly displayed in a plurality of different modes is made (Step T2). When the affirmative determination (YES) is made in Step T2, the determination that the solution obtained in the current formula element operation is a new solution is made (YES in Step S9). On the other hand, when the negative determination (NO) is made in Step T2, the determination that the solution obtained in the current formula element operation is not the new solution is made (NO in Step S9).

At this point, because the solution "9" of the formula element "(5+4)" is the solution of the operation corresponding to the operator having the first priority, the solution obtained in the last operation does not exist. Therefore, the negative determination (NO) is made in Step T1, and the negative determination (NO) is also made in Step T2, so that the determination that the solution is not the new solution is made (NO in Step S9).

Figure 3B:
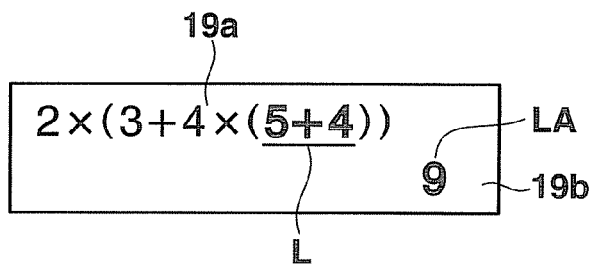

As illustrated in FIG. 3B, a formula element "(5+4)" L concerning the nth (=4) operator "+" (in double parentheses) to which the current operation processing is performed is distinctly displayed with underlining and in boldface, and a solution "9" LA of the formula element "(5+4)" L is displayed on the solution display region 19b of the display section 19 in boldface (Step S10).

In internal processing from the processing in Step S10, the formula element concerning the nth operator to which the operation processing is performed is replaced with the solution of the formula element. That is, at this point, the formula element "(5+4)" L of the formula "2×(3+4×(5+4))" to which the current operation processing is performed is replaced with the solution "9" LA of the formula element "(5+4)" L, and the formula "2×(3+4×(5+4))" is processed as a formula "2×(3+4×9)" after that (Step S12).

A determination whether the unprocessed operator exists in the internal processing formula "2×(3+4×9)" is made (Step S13). Because the determination that the unprocessed operator exists is made (YES in Step S13), the flow returns to the processing in Step S3.

Figure 3C:
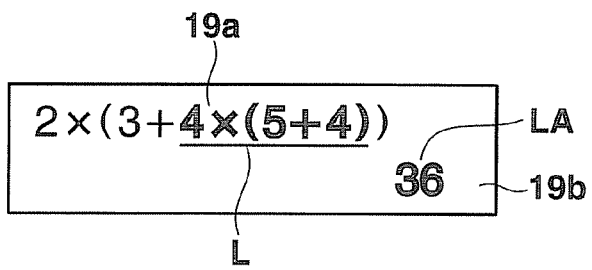

After the items of processing similar to those in Steps S3 to S7, the operation processing is performed to the formula element "4×9" concerning the nth (=3) operator "×" (in parentheses) having higher operation priority in the internal processing formula "2×(3+4×9)". At this point, the determination that the operation error is not produced is made because the solution "36" is obtained (NO in Step S8). The solution "9" obtained in the last operation does not remain (NO in Step T1), and the solution "36" is not the solution corresponding to the formula element that is distinctly displayed in the plurality of different modes (NO in Step T2). Therefore, the determination that the solution is not the new solution is made (NO in Step S9). As illustrated in FIG. 3C, in the formula "2×(3+4×(5+4))", the formula element "4×(5+4)" L is distinctly displayed with underlining and in boldface, the previous solution "9" is rewritten by the solution "36" LA of the formula element "4×(5+4)" L in the solution display region 19b of the display section 19, and the solution "36" LA is displayed in boldface (Step S10).

In internal processing from the processing in Step S10, the formula element "4×9" of the previous internal processing formula "2×(3+4×9)" to which the operation processing is performed is replaced with the solution "36" of the formula element "4×9", and the internal processing formula "2×(3+4×9)" is processed as a formula "2×(3+36)" after that (Step S12).

Figure 3D:
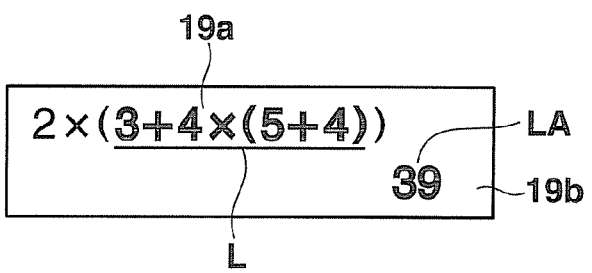

Then the flow returns to the processing in Step S3, the operation processing is performed to the formula element "3+36" concerning the nth (=2) operator "+" (in parentheses) having higher operation priority in the internal processing formula "2×(3+36)". At this point, the determination that the operation error is not produced is made because the solution "39" is obtained (NO in Step S8). The solution "36" obtained in the last operation does not remain (NO in Step T1), and the solution "39" is not the solution corresponding to the formula element that is distinctly displayed in the plurality of different modes (NO in Step T2). Therefore, the determination that the solution is not the new solution is made (NO in Step S9). As illustrated in FIG. 3D, in the formula "2×(3+4×(5+4))", the formula element "3+4×(5+4)" L is distinctly displayed with underlining and in boldface, the previous solution "36" is rewritten by the solution "39" LA of the formula element "3+4×(5+4)" L in the solution display region 19b of the display section 19, and the solution "39" LA is displayed in boldface (Step S10).

Similarly, in internal processing from the processing in Step S10, the formula element "3+36" of the previous internal processing formula "2×(3+36)" to which the current operation processing is performed is replaced with the solution "39" of the formula element "3+36", and the internal processing formula "2×(3+36)" is processed as a formula "2×39" after that (Step S12).

Figure 3E:
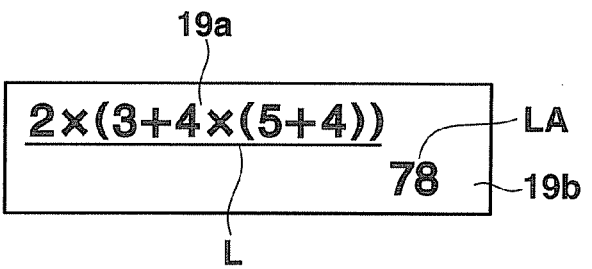

Then the flow returns to the processing in Step S3, the operation processing is performed to the formula element "2×39" concerning the nth (=1) operator "×" that is the final operator in the internal processing formula "2×39". At this point, the determination that the operation error is not produced is made because the solution "78" is obtained (NO in Step S8). The solution "78" obtained in the last operation does not remain (NO in Step T1), and the solution "78" is not the solution corresponding to the formula element that is distinctly displayed in the plurality of different modes (NO in Step T2). Therefore, the determination that the solution is not the new solution is made (NO in Step S9). As illustrated in FIG. 3E, in the formula "2×(3+4×(5+4))", the formula element "2×(3+4×(5+4))" L is distinctly displayed with underlining and in boldface, the previous solution "39" is rewritten by the solution "78" LA of the formula element "2×(3+4×(5+4))" L in the solution display region 19b of the display section 19, and the solution "78" LA is displayed in boldface (Step S10).

The internal processing formula becomes the solution "78" thereof (Step S12), and the determination that the unprocessed operator does not exist is made (NO in Step S13). Therefore, the operation processing associated with the sequence of operation process slideshow modes is ended (Step S15).

Thus, in the formula "2×(3+4×(5+4))" displayed as the operation object in the formula display region 19a of the display section 19, each formula element L following the operation priority of each operator is distinctly displayed in the order of "(5+4)"→"4×(5+4)"→"3+4×(5+4)"→"2×(3+4×(5+4))" while the display contents are left. Each formula element is distinctly displayed according to the operation priority with underlining and in boldface, and the solution LA of the corresponding formula element is displayed every time in a similar boldface in the formula display region 19a of the display section 19 in the order of "9"→"36"→"39"→"78".

Therefore, while the original formula is displayed, the order in which the operation processing is performed to the formula and the operation result of each order can easily be confirmed by the slideshow.

Second Embodiment

Figure 4A:
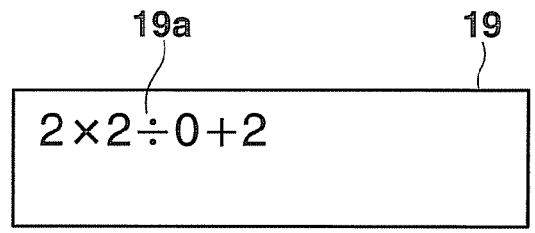
FIGS. 4A, 4B, and 4C illustrate specific example (part 2) of a display operation according to the formula operation processing associated with the performance of the operation process slideshow mode of the electronic calculator 10.
Figure 4B:
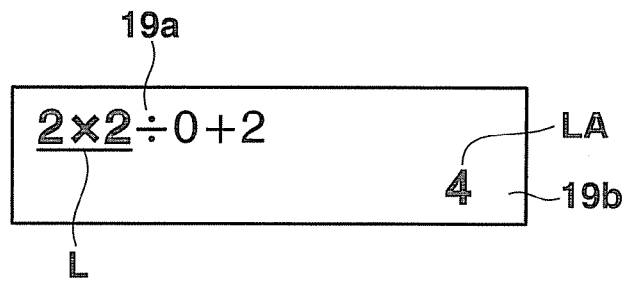
Figure 4C:
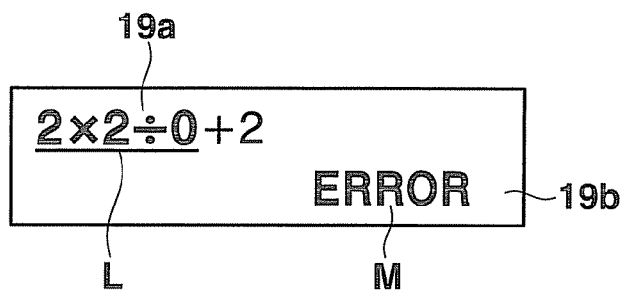

FIGS. 4A, 4B, and 4C illustrate a specific example (part 2) of the display operation according to the formula operation processing associated with the operation process slideshow mode performed by the electronic calculator 10.

As illustrated in FIG. 4A, in response to the user manipulation, an operation object formula "2×2÷0+2" is displayed in the formula display region 19a of the display section 19 (Step S1). The instruction to perform the operation process slideshow mode is provided in response to the user manipulation (YES in Step S2).

The counter n is set to the initial value "1" (Step S3), the operation priority of the nth (=1) operator "×" in the formula "2×2÷0+2" and the operation priority of the (n+1)th (=2) operator "÷" are compared to each other (Step S4), and the determination whether the nth (=1) operator "×" has lower priority than the (n+1)th (=2) operator "÷" is made (Step S5).

At this point, because the operator "×" (in parentheses) is equal to the operator "÷" in the priority, the determination that the nth (=1) operator "×" does not have lower priority is made (NO in Step S5).

The operation processing is performed to the formula element "2×2" concerning the nth (=1) operator "×" (Step S7) to make the determination whether the operation error in which the solution is not obtained is produced (Step S8).

The determination that the operation error is not produced is made (NO in Step S8) because the solution "4" of the formula element "2×2" is obtained.

Then the determination whether the solution "4" of the formula element "2×2" to which the current operation processing is performed is the new solution is made (Step S9).

At this point, because the solution "4" of the formula element "2×2" is the solution of the operation corresponding to the operator having the first priority, the solution obtained in the last operation does not exist. Therefore, the negative determination (NO) is made in Step T1, and the negative determination (NO) is also made in Step T2, so that the determination that the solution is not the new solution is made (NO in Step S9).

As illustrated in FIG. 4B, a formula element "2×2" L concerning the nth (=1) operator "×" to which the current operation processing is performed is distinctly displayed with underlining and in boldface, and a solution "4" LA of the formula element "2×2" L is displayed on the solution display region 19b of the display section 19 in boldface (Step S10).

In internal processing from the processing in Step S10, the formula element "2×2" L of the formula "2×2÷0+2" to which the current operation processing is performed is replaced with the solution "4" LA of the formula element "2×2" L", and the internal processing formula "2×2÷0+2" is processed as a formula "4÷0÷2" after that (Step S12).

The determination whether the unprocessed operator exists in the formula "4÷0+2" is made (Step S13). Because the determination that the unprocessed operator exists is made (YES in Step S13), the flow returns to the processing in Step S3.

The operation processing is performed to the formula element "4÷0" concerning the nth (=1) operator "÷" having higher priority in the internal processing formula "4÷0+2" (Steps S3 to S7).

At this point, the determination that the operation error is produced is made because the solution of the formula element "4÷0" ("2×2÷0" on the display) is not obtained (YES in Step S8).

As illustrated in FIG. 4C, the formula element "4÷0" ("2×2÷0" on the display) L concerning the nth (=1) operator "÷" in the internal processing formula "4÷0+2", which is determined to be the current operation error, is distinctly displayed with underlining and in boldface, and an error message "ERROR" M is displayed in boldface in the solution display region 19b of the display section 19 (Step S14).

Then the operation processing associated with the sequence of operation process slideshow modes is ended (Step S15).

Thus, in the formula displayed as the operation object in the formula display region 19a of the display section 19, each formula element L following the operation priority of each operator is distinctly displayed in order while the display contents are left. Each formula element is distinctly displayed according to the operation priority, and the solution LA of the corresponding formula element is sequentially displayed every time in a similar boldface in the formula display region 19a of the display section 19.

Therefore, when the operation error is produced in the operation process of the corresponding formula element having the operation priority of the operator, the error message M is displayed while the formula element L is displayed at the point where the operation error is produced, and the operation is ended.

Therefore, not only the order in which the operation processing is performed to the formula and the operation result of each order can easily be confirmed by the slideshow while the original formula is displayed, but also the formula element in which the operation error is produced in the process of the operation processing can clearly be confirmed.

Third Embodiment

FIGS. 5A, 5B, 5C, 5D, 5E, and 5F illustrate a specific example (part 3) of the display operation according to the formula operation processing associated with the operation process slideshow mode performed by the electronic calculator 10.

Figure 5A:
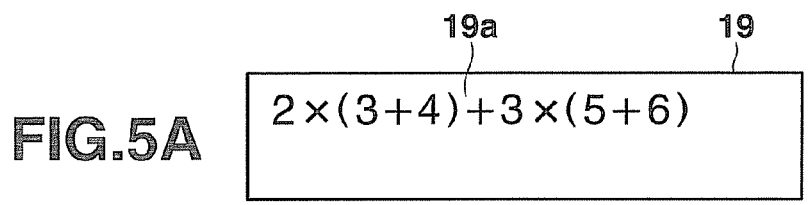
FIGS. 5A, 5B, 5C, 5D, 5E, and 5F illustrate specific example (part 3) of a display operation according to the formula operation processing associated with the performance of the operation process slideshow mode of the electronic calculator 10.

As illustrated in FIG. 5A, in response to the user manipulation, an operation object formula "2×(3+4)+3×(5+6)" is displayed in the formula display region 19a of the display section 19 (Step S1). When the instruction to perform the operation process slideshow mode is provided in response to the manipulations (YES in Step S2), the counter n that specifies each operator included in the displayed formula is set to the initial value "1" (Step S3).

The operation priority of the nth (=1) operator "×" in the formula "2×(3+4)+3×(5+6)" and the operation priority of the (n+1)th (=2) operator "+" (in parentheses) are compared to each other based on the operator priority table 12b (Step S4), and the determination whether the nth (=1) operator "×" has lower priority than the (n+1)th (=2) operator "+" (in parentheses) is made (Step S5).

At this point, the determination that the nth (=1) operator "×" has lower priority is made (YES in Step S5), and the counter n is incremented by "1" and set to "2" (Step S6).

Then the operation priority of the nth (=2) operator "+" (in parentheses) in the formula "2×(3+4)+3×(5+6)" and the operation priority of the (n+1)th (=3) operator "+" are compared to each other (Step S4). At this point, because the operator "+" (in parentheses) has higher priority than the operator "+", the determination that the nth (=2) operator "+" (in parentheses) does not have lower priority is made (NO in Step S5).

Therefore, the operation processing is performed to the formula element "(3+4)" concerning the nth (=2) operator "+" (in double parentheses) (Step S7) to make the determination whether the operation error in which the solution is not obtained is produced (Step S8).

The determination that the operation error is not produced is made (NO in Step S8) because the solution "7" of the formula element "(3+4)" is obtained.

Then the determination whether the solution "7" of the formula element "(3+4)" to which the current operation processing is performed is the new solution is made (Step S9).

At this point, because the solution "7" of the formula element "(3+4)" is the solution of the operation corresponding to the operator having the first priority, the solution obtained in the last operation does not exist. Therefore, negative determination (NO) is made in Step T1, the negative determination (NO) is also made in Step T2, and the determination that the solution is not the new solution is made (NO in Step S9).

Figure 5B:
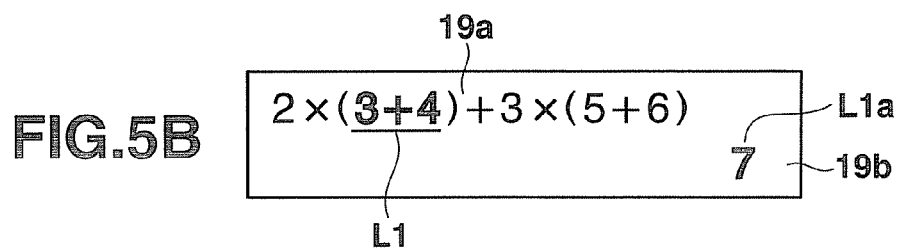

As illustrated in FIG. 5B, a formula element "(3+4)" L1 concerning the nth (=2) operator "+" to which the current operation processing is performed is distinctly displayed with underlining and in boldface, and a solution "7" L1a of the formula element "(3+4)" L1 is displayed in boldface in the solution display region 19b of the display section 19 (Step S10).

In internal processing from the processing in Step S10, the formula element "(3+4)" L1 of the formula "2×(3+4)+3×(5+6)" to which the current operation processing is performed is replaced with the solution "7" L1a of the formula element "(3+4)" L1, and the formula "2×(3+4)+3×(5+6)" is processed as a formula "2×7+3×(5+6)" after that (Step S12).

A determination whether the unprocessed operator exists in the formula "2×7+3×(5+6)" is made (Step S13). Because the determination that the unprocessed operator exists is made (YES in Step S13), the flow returns to the processing in Step S3.

Figure 5C:
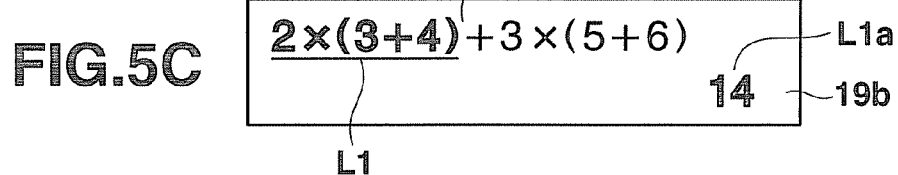

After the items of processing similar to those in Steps S3 to S10, the operation processing is performed to the formula element "2×7" concerning the nth (=1) operator "×" in the internal processing formula "2×7+3×(5+6)". As illustrated in FIG. 5C, in the displayed formula "2×(3+4)+3×(5+6)", the formula element "2×(3+4)" L1 concerning the nth (=1) operator "×" is distinctly displayed with underlining and in boldface, the previous solution "7" is rewritten by the solution "14" L1a of the formula element "2×(3+4)" L1 in the solution display region 19b of the display section 19, and the solution "14" L1a is displayed in boldface (Step S8 [NO]→Step S9 [NO]→Step S10).

In internal processing from the processing in Step S10, the formula element "2×7" of the previous internal processing formula "2×7+3×(5+6)" to which the operation processing is performed is replaced with the solution "14" of the formula element "2×7", and the internal processing formula "2×7+3×(5+6)" is processed as a formula "14+3×(5+6)" after that (Step S12).

Then the flow returns to the processing in Step S3, the operation processing is performed to the formula element "5+6" concerning the nth (=3) operator "+" (in parentheses) having higher operation priority in the internal processing formula "14+3×(5+6)" (Steps S3 to S7).

At this point, the determination that the operation error is not produced is made because the solution "11" of the formula element "5+6" is obtained (NO in Step S8).

Then the determination whether the solution "11" of the formula element "(5+6)" to which the current operation processing is performed is the new solution is made (Step S9). The solution "14" L1a obtained by the last operation is different from the solution "11" obtained by the current operation, and the solution "14" L1a remains without disappearing through the current operation processing. Accordingly, because the affirmative determination (YES) is made in Step T1, the determination that the solution obtained in the current formula element operation is a new solution is obtained (YES in Step S9). The determination that the solution "11" obtained by the current operation is the new solution is made (YES in Step S9). The following distinction display of the formula element L2 associated with the operation processing is different from the distinction display of the formula element L1 to which the operation processing is previously performed, and a solution L2a of the formula element L2 is newly set independently of the solution L1a of the previous formula element L1 (Step S11).

Figure 5D:
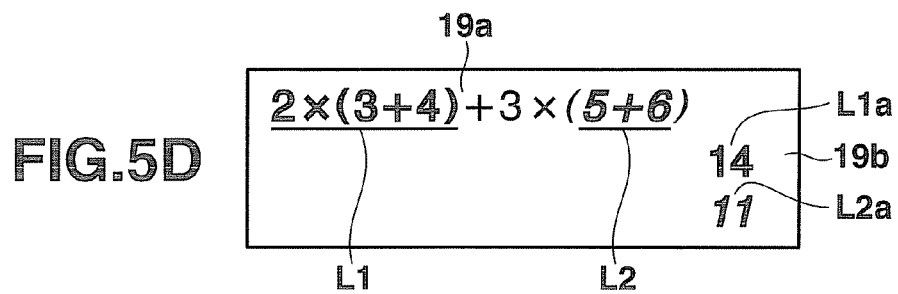

As illustrated in FIG. 5D, the formula element "5+6" L2 to which the current operation processing is performed is newly and distinctly displayed with underlining and in italics, and a solution (work-in-progress solution) "11" L2a of the formula element "5+6" L2 is displayed in the solution display region 19b of the display section 19 in a new italic boldface that is different from that of the solution (work-in-progress solution) "14" L1a (Step S11).

In internal processing from the processing in Step S11, the formula element "(5+6)" L2 of the internal processing formula "14+3×(5+6)" to which the current operation processing is performed is replaced with the solution "11" L2a of the formula element "(5+6)" L2, and the internal processing formula "14+3×(5+6)" is processed as a formula "14+3×11" after that (Step S12).

The determination whether the unprocessed operator exists in the internal processing formula "14+3×11" is made (Step S13). Because the determination that the unprocessed operator exists is made (YES in Step S13), the flow returns to the processing in Step S3.

Figure 5E:
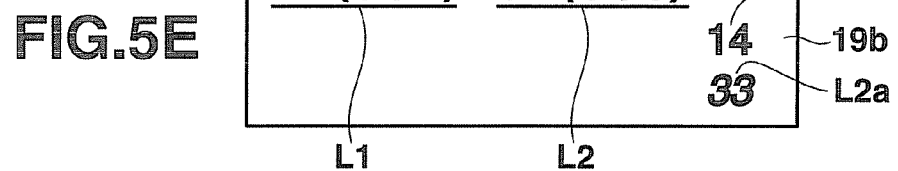

After the items of processing similar to those in Steps S3 to S10, the operation processing is performed to the formula element "3×11" concerning the nth (=2) operator "×" having higher operation priority in the internal processing formula "14+3×11". As illustrated in FIG. 5E, in the displayed formula "2×(3+4)+3×(5+6)", the formula element "3×(5+6)" L2 is distinctly displayed with underlining and in italic boldface, the previous solution "11" is rewritten by the solution "33" La2 of the formula element "3×(5+6)" L2 in the solution display region 19b of the display section 19, and the solution "33" La2 is displayed in italic boldface (Step S8 [NO]→Step S9 [NO]→Step S10).

In internal processing from the processing in Step S10, the formula element "3×11" of the previous internal processing formula "14+3×11" to which the operation processing is performed is replaced with the solution "33" of the formula element "3×11", and the internal processing formula "14+3×11" is processed as a formula "14+33" after that (Step S12).

Then the flow returns to the processing in Step S3, the operation processing is performed to the formula element "14+33" concerning the nth (=1) operator "+" that is the final operator in the internal processing formula "14+33" (Steps S3 to S7).

At this point, the determination whether the solution "47" of the formula element "14+33" to which the current operation processing is performed is the new solution is made (Step S9). The negative determination is made in Step T1 because the solution "33" obtained by the last operation disappears through the current operation processing (NO in Step T1). The determination that the solution "47" obtained by the current operation is obtained from the solutions ("14" and "33") corresponding to the formula elements ("2×(3+4)" and "3×(5+6)") that are distinctly displayed in the plurality (two) of different modes is made in Step T2 (YES in Step T2). Accordingly, the determination that the solution "47" obtained by the current operation is the new solution is made (YES in Step S9).

The distinction display of a formula element L3 associated with the following operation processing is different from the distinction displays of the formula elements L1 and L2 to which the operation processing is previously performed, and a solution L3a of the formula element L3 is newly displayed independently of the solutions L1a and L2a of the previous formula elements L1 and L2 (Step S11).

Figure 5F:
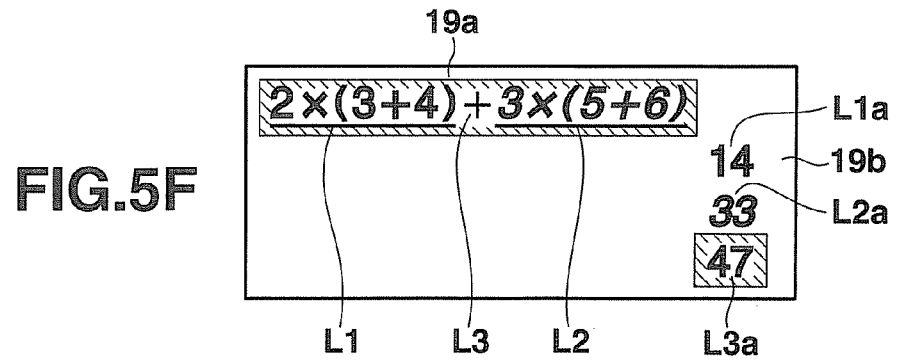

As illustrated in FIG. 5F, while the distinction displays of the formula element "2×(3+4)" L1 and formula element "3×(5+6)" L2, to which the operation processing is already performed according to the operation priority, and the solutions "14" L1a and "33" L2a of the formula elements L1 and L2 are left, the formula element (at this point, all the elements) "2×(3+4)+3×(5+6)" L3 corresponding to the internal processing formula "14+33" to which the current operation processing is performed is distinctly displayed by the hatching, and a solution "47" L3a of the formula element "2×(3+4)+3×(5+6)" L3 is newly displayed by the hatching in the solution display region 19b of the display section 19 (Step S10).

The internal processing formula becomes the solution "47" thereof (Step S12), and the determination that the unprocessed operator does not exist is made (NO in Step S13). Therefore, the operation processing associated with the sequence of operation process slideshow modes is ended (Step S15).

Thus, in the formula displayed as the operation object in the formula display region 19a of the display section 19, each of the formula elements L1, L2, and L3 following the operation priority of each operator is distinctly displayed in order while the display contents are left. Each formula of the formula elements L1, L2, and L3 is distinctly displayed according to the operation priority, and each of the solutions L1a, L2a, and L3a of the corresponding formula elements is individually and sequentially displayed every time in a different mode in the formula display region 19a of the display section 19.

Therefore, while the original formula is displayed, the order in which the operation processing is performed to the formula and the operation result of each order can clearly be confirmed in the form of the slideshow even if the different work-in-progress solution is produced.

[Modification]

Figure 6A:
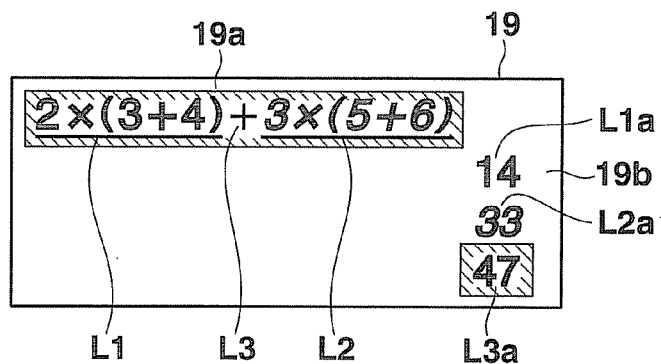
FIGS. 6A, 6B, and 6C illustrate a modification of the display operation according to the formula operation processing associated with the performance of the operation process slideshow mode of the electronic calculator 10.
Figure 6B:
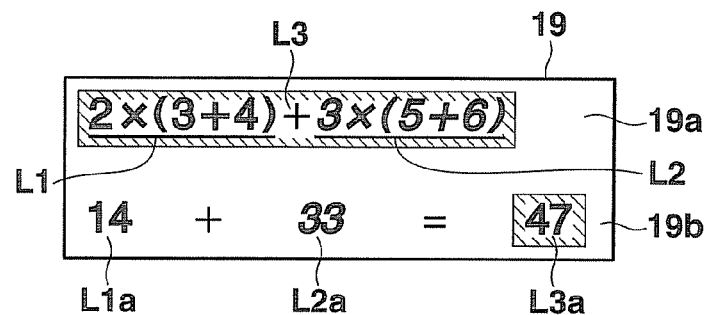
Figure 6C:
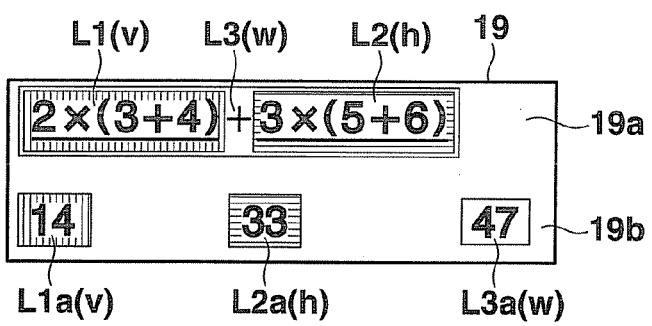

FIGS. 6A, 6B, and 6C illustrate a modification of the display operation following the formula operation processing associated with the operation process slideshow mode performed by the electronic calculator 10.

In the third embodiment, as illustrated in FIG. 6A, the solutions L1a, L2a, and L3a corresponding to the formula elements L1, L2, and L3 having the operation priorities in the operation object formula are individually displayed in the solution display region 19b of the display section 19 while linefeed is inserted, and the solutions L1a, L2a, and L3a are displayed in a distinction mode similar to the distinction mode of the corresponding formula element.

On the other hand, as illustrated in FIG. 6B, the solutions L1a, L2a, and L3a corresponding to the formula elements L1, L2, and L3 having the operation priorities in the formula may individually be displayed in one line in the solution display region 19b of the display section 19, or the solutions L1a, L2a, and L3a may be displayed in an easy-to-understand manner in the form of a relational expression of the work-in-progress solutions L1a and L2a and final solution L3a corresponding to the mathematical expressions in the formula display region 19a.

In the third embodiment, as illustrated in FIG. 6A, in the formula elements L1, L2, and L3 having the operation priorities in the operation object formula, the first formula element L1 is distinctly displayed with underlining and in boldface, the second formula element L2 is distinctly displayed with underlining and in italic boldface, and the third formula element L3 including the first and second formula elements L1 and L2 is distinctly displayed by the hatching.

On the other hand, as illustrated in FIG. 6C, while a character style is common to the formula elements L1, L2, and L3, each of the formula elements L1, L2, and L3 may distinctly be displayed in a different mode by changing a type of the hatching such as a vertically-striped pattern (v), a horizontally-striped pattern (h), and a frame (w), by changing a color of the hatching, or by inverting the formula elements L1, L2, and L3. In such cases, similarly each of the solutions L1a, L2a, and L3a corresponding to the formula elements L1, L2, and L3 may distinctly be displayed in a different manner by changing a type of the hatching such as the vertically-striped pattern (v), the horizontally-striped pattern (h), and the frame (w), by changing a color of the hatching, and by inverting the solutions L1a, L2a, and L3a.

Fourth Embodiment

FIGS. 7A, 7B, 7C, 7D, 7E, and 7F illustrate a specific example (part 4) of the display operation following the formula operation processing associated with the operation process slideshow mode performed by the electronic calculator 10.

In the fourth embodiment, the display region of the liquid crystal display section 19 is restricted to two-line display including a one-line-display formula display region 19a at an upper stage and a one-line-display solution display region 19b at a lower stage.

The items of processing in Steps S9 and S11 are not performed in the formula operation processing (see FIG. 2A) associated with the operation process slideshow mode performed by the two-line-display electronic calculator 10.

As illustrated in FIG. 7A, in response to the user manipulation, an operation object formula "2×(3+4)+3×(5+6))" is displayed in the formula display region 19a of the display section 19 (Step S1). When the instruction to perform the operation process slideshow mode is provided in response to the manipulation (YES in Step S2), the counter n that specifies each operator included in the displayed formula is set to the initial value "1" (Step S3).

The operation priority of the nth (=1) operator "×" in the formula "2×(3+4)+3×(5+6)" and the operation priority of the (n+1)th (=2) operator "+" (in parentheses) are compared to each other based on the operator priority table 12b (Step S4), and the determination whether the nth (=1) operator "×" has lower priority than the (n+1)th (=2) operator "+" is made (Step S5).

At this point, the determination that the nth (=1) operator "×" has lower priority is made (YES in Step S5), the counter n is incremented by "1" and set to "2" (Step S6).

Then, the operation priority of the nth (=2) operator "+" (in parentheses) in the formula "2×(3+4)+3×(5+6)" and the operation priority of the (n+1)th (=3) operator "+" are compared to each other (Step S4), and the determination that the nth (=2) operator "+" does not have lower priority is made (NO in Step S5).

Therefore, the operation processing is performed to the formula element "(3+4)" concerning the nth (=2) operator "+" (Step S7), and the determination that the operation error is not produced is made (NO in Step S8) because the solution "7" of the formula element "(3+4)" is obtained.

As illustrated in FIG. 7B, while the formula element "(3+4)" L concerning the nth (=2) operator "+" to which the current operation processing is performed is distinctly displayed with underlining and in boldface, the solution "7" LA of the formula element "(3+4)" L is displayed in boldface in the solution display region 19b at the lower stage of the display section 19 (Step S10).

In internal processing from the processing in Step S10, the formula element "(3+4)" L of the formula "2×(3+4)+3×(5+6)" to which the current operation processing is performed is replaced with the solution "7" LA of the formula element "(3+4)", and the internal processing formula "2×(3+4)+3×(5+6)" is processed as a formula "2×7+3×(5+6)" after that (Step S12).

The determination whether the unprocessed operator exists in the formula "2×7+3×(5+6)" is made (Step S13). Because the determination that the unprocessed operator exists is made (YES in Step S13), the flow returns to the processing in Step S3.

After the items of processing similar to those in Steps S3 to S10, the operation processing is performed to the formula element "2×7" concerning the nth (=1) operator "×" in the formula "2×7+3×(5+6)". As illustrated in FIG. 7C, in the displayed formula "2×(3+4)+3×(5+6)", the formula element "2×(3+4)" L concerning the nth (=1) operator "×" is distinctly displayed with underlining and in boldface, the previous solution "7" is rewritten by the solution "14" LA in the solution display region 19b at the lower stage of the display section 19, and the solution "14" LA is displayed in boldface (Step S10).

In internal processing from the processing in Step S10, the formula element "2×7" of the previous internal processing formula "2×7+3×(5+6)" to which the current operation processing is performed is replaced with the solution "14" of the formula element "2×7", and the internal processing formula "2×7+3×(5+6)" is processed as a formula "14+3×(5+6)" after that (Step S12).

Then the flow returns to the processing in Step S3, the operation processing is performed to the formula element "5+6" concerning the nth (=3) operator "+" (in parentheses) having higher priority in the internal processing formula "14+3×(5+6)" (Steps S3 to S7).

As illustrated in FIG. 7D, the distinction display of the formula element "2×(3+4)" to which the previous operation processing is performed is released, the formula element "5+6" L to which the current operation processing is performed is distinctly displayed with underlining and in boldface, the previous solution (work-in-progress solution) "14" is replaced with the solution (work-in-progress solution) "11"

LA of the formula element "5+6" L, and the solution "11" LA is displayed in the solution display region 19b at the lower stage of the display section 19 (Step S10).

In internal processing from the processing in Step S10, the formula element "(5+6)" L of the internal processing formula "14+3×(5+6)" to which the current operation processing is performed is replaced with the solution "11" LA of the formula element "(5+6)" L, and the internal processing formula "14+3×(5+6)" is processed as a formula "14+3×11" after that (Step S12).

The determination whether the unprocessed operator exists in the internal processing formula "14+3×11" is made (Step S13). Because the determination that the unprocessed operator exists is made (YES in Step S13), the flow returns to the processing in Step S3.

After the items of processing similar to those in Steps S3 to S10, the operation processing is performed to the formula element "3×11" concerning the nth (=2) operator "×" having higher operation priority in the internal processing formula "14+3×11". As illustrated in FIG. 7E, in the displayed formula "2×(3+4)+3×(5+6)", only the formula element "3×(5+6)" L is distinctly displayed with underlining and in boldface, the previous solution "11" is rewritten by the solution "33" LA of the formula element "3×(5+6)" L, and the solution "33" LA is displayed in boldface (Step S10).

In internal processing from the processing in Step S10, the formula element "3×11" of the previous internal processing formula "14+3×11" to which the current operation processing is performed is replaced with the solution "33" of the formula element "3×11", and the internal processing formula "14+3×11" is processed as a formula "14+33" after that (Step S12).

Then the flow returns to the processing in Step S3, the operation processing is performed to the formula element "14+33" concerning the nth (=1) operator "+" that is the final operator in the internal processing formula "14+33" (Steps S3 to S7).

As illustrated in FIG. 7F, the formula element (at this point, all the elements) "2×(3+4)+3×(5+6)" L corresponding to the internal processing formula "14+33" to which the current operation processing is performed is distinctly displayed with underlining and in boldface, and the solution "47" LA of the formula element "2×(3+4)+3×(5+6)" L is displayed in boldface in the solution display region 19b of the display section 19 while the solution "33" LA is replaced with the solution "47" LA (Step S10).

The internal processing formula becomes the solution "47" thereof (Step S12), and the determination that the unprocessed operator does not exist is made (NO in Step S13). Therefore, the operation processing associated with the sequence of operation process slideshow modes is ended (Step S15).

Thus, even in the two-line-display compact electronic calculator 10, in the formula displayed as the operation object in the formula display region 19a at the upper stage of the display section 19, the formula elements LA, . . . following the operation priority of each operator are distinctly displayed in order while the display contents are left. Each of the formula elements LA, . . . is distinctly displayed according to the operation priority, and each of the solutions LA, . . . of the corresponding formula elements is sequentially displayed every time while replaced in the solution display region 19b at the lower stage of the display section 19.

Therefore, while the original formula is displayed, the order in which the operation processing is performed to the formula and the operation result of each order can clearly be confirmed in the form of the slideshow even if the work-in-progress solution is produced.

The technique of operating the operation process slideshow mode with the electronic calculator 10 described in the embodiment, that is, the technique such as the formula operation processing illustrated in the flowcharts of FIGS. 2A and 2B can be distributed while stored as a program that can be executed with the computer in an external storage medium (13) such as a memory card (such as a ROM card and a RAM card), a magnetic disk (such as a floppy disk and a hard disk), an optical disk (such as a CD-ROM and a DVD), and a semiconductor memory. The computer (11) of the electronic calculator 10 reads the program stored in the external storage medium (13) in the storage devices (12) and (17), and the operation of the computer (11) is controlled by the read program. Therefore, the operation process slideshow function is realized while the original formula is completely displayed as described in the embodiments, and the items of processing similar to those of the technique can be performed.

The program data used to realize the technique can be transmitted in the form of the program code on the communication network (public line) N, the program data is captured in the computer (11) of the electronic calculator 10 by the communication device (16) connected to the communication network N, and the operation process slideshow function can be realized while the original formula is completely displayed.

Further, the program data is captured in a personal computer, and the operation process slideshow function can be realized while the original formula is completely displayed.

The invention is not limited to the embodiments, but various modifications can be made without departing from the scope of the invention. The embodiments include the inventions in various stages, and the various inventions can be extracted by an appropriate combination in a plurality of disclosed constituents. For example, even if some constituents are removed from all the constituents described in each embodiment, or even if some constituents are combined in a different mode, the configuration in which some constituents are removed or the configuration in which some constituents are combined can be extracted as the invention, when the problem described in problem that the invention is to solve can be solved to obtain the effect described in effect of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic calculator, comprising:
a display device;
a storage having an operator priority table in which an operator operation priority is stored; and
a processor that performs:
causing the display device to display a formula;
performing sequentially an operation of each formula element constituting the formula displayed on the display device according to the operator priority table;
displaying distinctly the formula element, to which the operation is performed in the formula displayed on the display device, on the display device each time each formula element operation is sequentially performed;

displaying a solution corresponding to the formula element to which the operation is performed on the display device each time each formula element operation is sequentially performed;

displaying distinctly the formula element to which a current operation is performed on the display device in a mode that is different from that of the formula element to which the operation is already performed, when the solution obtained by the last formula element operation is different from the solution obtained by the current formula element operation while remaining without disappearing by current operation processing; and displaying the solution corresponding to the formula element to which the current operation is performed on the display device independently of the solution obtained by the last formula element operation, wherein the solution obtained by the last formula element operation is different from the solution obtained by the current formula element operation while remaining without disappearing by the current operation processing.

2. The electronic calculator according to claim 1, wherein the processor further performs:

displaying a message that an operation cannot be performed when the operation cannot be performed, each time each formula element operation is sequentially performed.

3. The electronic calculator according to claim 1, wherein the processor further performs:

displaying distinctly the formula element to which a current operation is performed on the display device in a mode that is different from that of the formula element to which the operation is already performed, when the solution obtained by the current formula element operation is obtained from the solution corresponding to the formula element that is distinctly displayed in a plurality of different modes; and displaying the solution corresponding to the formula element to which the current operation is performed on the display device independently of another solution, when the solution obtained by the current formula element operation is obtained from the solution corresponding to the formula element that is distinctly displayed in the plurality of different modes.

4. The electronic calculator according to claim 1, wherein the processor further performs:

performing sequentially each formula element operation at constant time intervals; and updating and displaying sequentially the solution corresponding to the formula element on the display device while displaying distinctly the formula element to which the operation is performed.

5. A non-transitory computer-readable medium in which a software program is stored, the software program being executed by a computer system including a display device and a storage having an operator priority table in which an operation priority of an operator is stored, the software program comprising a sequence of commands for causing the computer system to perform:

displaying a formula on the display device;

performing sequentially an operation of each formula element constituting the formula displayed on the display device according to the operator priority table;

displaying distinctly the formula element, to which the operation is performed in the formula displayed on the display device, on the display device each time each formula element operation is sequentially performed; and displaying a solution corresponding to the formula element to which the operation is performed on the display device each time each formula element operation is sequentially performed;

displaying distinctly the formula element to which a current operation is performed by the display device in a mode that is different from that of the formula element to which the operation is already performed, when the solution obtained by the last formula element operation is different from the solution obtained by the current formula element operation while remaining without disappearing by current operation processing; and displaying the solution corresponding to the formula element to which the current operation is performed on the display device independently of the solution obtained by the last formula element operation, when the solution obtained by the last formula element operation is different from the solution obtained by the current formula element operation while remaining without disappearing by the current operation processing.

6. An electronic calculator, comprising:

a formula display section that displays a formula;

an operation performing section that performs sequentially each formula element operation according to an operation priority of each formula element constituting the formula displayed by the formula display section;

a distinction display section that displays distinctly the formula element, to which the operation is performed in the formula displayed by the formula display section, each time the operation performing section sequentially performs each formula element operation; and a work-in-progress solution display section that displays a solution corresponding to the formula element to which the operation is performed each time the operation performing section sequentially performs each formula element operation wherein the distinction display section distinctly displays the formula element to which a current operation is performed on the display device in a mode that is different from that of the formula element to which the operation is already performed, when the solution obtained by the last formula element operation is different from the solution obtained by the current formula element operation in association with the current formula element operation performed by the operation performing section while remaining without disappearing by current operation processing; and the distinction display section displays the solution corresponding to the formula element to which the current operation is performed on the display device independently of the solution obtained by the last formula element operation, when the solution obtained by the last formula element operation is different from the solution obtained by the current formula element operation in association with the current formula element operation performed by the operation performing section while remaining without disappearing by the current operation processing.

7. The electronic calculator according to claim 6, further comprising:

an operation impossibility display section that displays a message that an operation cannot be performed when the operation cannot be performed, each time the operation performing section sequentially performs each formula element operation.

8. The electronic calculator according to claim 6, wherein:
the distinction display section distinctly displays the formula element to which a current operation is performed on the display device in a mode that is different from that of the formula element to which the operation is already performed, when the solution obtained by the current formula element operation is obtained from the solution corresponding to the formula element that is distinctly displayed in a plurality of different modes in association with the current formula element operation performed by the operation performing section; and
the work-in-progress solution display section displays the solution corresponding to the formula element to which the current operation is performed on the display device independently of the solution obtained by the last formula element operation, when the solution obtained by the current formula element operation is obtained from the solution corresponding to the formula element that is distinctly displayed in the plurality of different modes in association with the current formula element operation performed by the operation performing section.

9. The electronic calculator according to claim 6, wherein:
the operation performing section sequentially performs each formula element operation at constant time intervals; and
the work-in-progress solution display section sequentially updates and displays the solution corresponding to the formula element while displaying distinctly the formula element to which the operation is performed.

\* \* \* \* \*